United States Patent [19]

Kotok et al.

[11] 3,836,889

[45] Sept. 17, 1974

[54] PRIORITY INTERRUPTION CIRCUITS FOR DIGITAL COMPUTER SYSTEMS

[75] Inventors: Alan Kotok, Waltham; Allan R. Kent, Framingham; David A. Gross, Acton, all of Mass.

[73] Assignee: Digital Equipment Corporation, Maynard, Mass.

[22] Filed: Mar. 23, 1973

[21] Appl. No.: 344,089

[52] U.S. Cl. .......... 340/172.5
[51] Int. Cl. .......... G06f 9/18
[58] Field of Search .......... 340/172.5

[56] References Cited

UNITED STATES PATENTS 3,710,324 1/1973 Cohen et al. .......... 340/172.5

*Primary Examiner*—Raulfe B. Zache
*Attorney, Agent, or Firm*—Cesari and McKenna

[57] ABSTRACT

A priority interruption circuit for use in a digital computer system. When a peripheral unit requires communication with a central processor unit or memory unit, it transmits a signal over a priority interruption line which corresponds to an assigned system priority level. The central processor unit receives this signal and a priority circuit starts a priority request sequence concurrently with other central processor unit operations. During this sequence the central processor unit generates data and control signals onto predetermined conductors in an interconnecting bus. One peripheral unit responds to all these signals and generates data onto the bus identifying itself and the nature of the service required. The central processor unit then uses a priority interruption instruction sequence to process this data the peripheral unit generates and it may then establish the needed communications without performing any polling operations.

17 Claims, 12 Drawing Figures

PATENTED SEP 17 1974 3,836,889

SHEET 01 OF 12

INTERRUPTION DATA WORD FIG.5

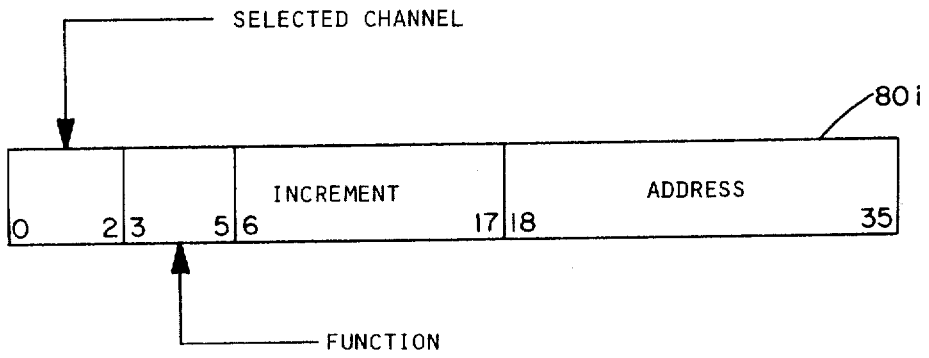

| CODE | MNEMONIC | FUNCTION |
|---|---|---|
| 000 | WAITING | PROCESSOR IS AWAITING A REPLY |
| 001 | PI NORMAL | START INTERRUPTION ROUTINE AT ADDRESS DEPENDENT ON PRIORITY |
| 010 | PI DISPATCH | START INTERRUPTION ROUTINE AT SPECIFIED ADDRESS (BITS 18-35) |
| 011 | PI INC MEM | ADD THE INCREMENT (BITS 6-17) TO THE CONTENTS OF A LOCATION DESIGNATED BY THE ADDRESS (BITS 18-35) |
| 100 | PI DATAO | PERFORM A DATAO OPERATION FROM ADDRESS (BITS 18-35) |
| 101 | PI DATAI | PERFORM A DATAI OPERATION TO ADDRESS (BITS 18-35) |

PRIORITY INTERRUPTION CIRCUITS FOR DIGITAL COMPUTER SYSTEMS

BACKGROUND OF THE INVENTION

This invention is directed to digital computer systems and more specifically to the interaction between peripheral units and central processor units in such digital computer systems.

In digital computer systems, data usually moves between a central processor unit and peripheral unit in response to interruption signals. An interruption signal from a specific peripheral unit can indicate several internal conditions. For example, such a signal might indicate that a peripheral unit contains data ready for transfer to the central processor unit or that the peripheral unit is ready to receive new data.

Normally a peripheral unit generates an interruption signal which the central processor unit receives and services in some programmed priority scheme. There are several priority schemes known in the art. In one, each peripheral unit contains a priority register. The priority register stores a coded priority designation which a programmer assigns to it and a decoder decodes this priority information. The decoder transmits a service request or "priority interruption" signal over an output conductor that corresponds to the priority in the priority register. A priority circuit in the central processor unit then compares the priority of the incoming interruption signal with the existing priority of the digital computer system.

Depending upon the relative priorities of the interruption signal and the current central processor unit priority level, the priority circuit may disregard the request, or, alternatively, cease work on the current program in process and service the new request. In order to service the request, the central processor unit begins a polling upon the completion of an instruction in the current program. The polling program identifies the peripheral unit and determines the conditons causing the interruption signal.

This polling operation is a routine which the central processr unit executes after it interrupts the current program and it must be completed before the central processor unit can return to the current program. This increases the time the central processor unit requires to execute the program.

In another data processing system, each peripheral unit transmits an interruption signal over one of several priority interruption wires which correspond to the respective priority levels. A priority granting wire, associated with each priority interruption level, connects, in seriatim, all peripheral units connected to the corresponding interruption wire. The location of each peripheral unit along a particular priority granting wire determines its priority within the general level which the granting wire designates.

During an interruption operation, one peripheral unit along the granting wire, which has requested an interruption and receives a signal on the granting wire indicating that the general priority level request has been granted, transmits an address over data lines to the central processor unit. The central processor unit then uses this address to start a service routine. While polling operations are limited or substantially reduced in this system, the relative priority of a particular peripheral unit within a priority level is fixed by the position of the peripheral unit in respect to the central processor unit along the granting wire.

In both these and other systems, the central processor unit does not receive directly any information with the interruption request regarding the type of operation which is to occur. Some preliminary sequence must occur to determine whether control, reading or writing operations are necessary to service the request. This adds a certain operating time increment which increases the time the central processor unit requires to execute a current program.

Therefore, it is an object of this invention to provide a digital computer system in which each peripheral unit can identify itself and the nature of the service which it requires.

Another object of the invention is to provide a digital computer system which facilitates changes in the assignment of priority levels to individual peripheral units.

SUMMARY

In accordance with this invention, a peripheral unit requests an interruption and a decoder then generates a priority interrupt signal and also enables a synchronizing circuit within the peripheral unit. When the central processor unit receives the priority request signal and acts upon it, it uses a priority interruption request sequence to generate a synchronizing signal and a series of signals identifying a general priority being granted. Any peripheral unit having the same general priority level as the granted priority and having previously generated a request is then set to receive an enabling signal from the central processor unit.

The enabling signal is transmitted along a control wire that connects all peripheral units in seriatim regardless of their priority levels. The signal travels down this wire until it reaches the first enabled peripheral unit along the wire. That unit blocks the enabling signal on the wire and transmits a digital word over data wires. The digital word identifies the priority level, a function to be performed and addressing information for subsequent use by the central processor unit in performing the designated function. Each peripheral unit can normally generate any of several such words, with the selection being dependnt upon the conditions causing the interruption. This information can eliminate the need for extensive polling operations.

This invention is pointed out with particularity in the appended claims. A more thorough understanding of the above and further object and advantages of this invention may be attained by referring to the following description taken in conjunction with the accompanying drawings.

BRIEF DESCRIPTION OF THE DRAWINGS

FIG. 5 is a representation of a digital word that circuitry in FIG. 1 generates.

DESCRIPTION OF AN ILLUSTRATIVE EMBODIMENT

In the following discussion, a "+1" or positive voltage represents a TRUE condition or logic ONE condition. A ground or "0" potential represents a FALSE condition or a logical ZERO condition. It is assumed that all data lines normally are held in the FALSE condition. In accordance with this description, therefore, the output of an AND circuit is positive (i.e., TRUE) when all the inputs are positive (i.e., TRUE). Similarly the set (or Q) output, of a flip-flop is positive (i.e. a TRUE signal) when the flip-flop is set. With respect to clocked flip-flops, the flip-flop assumes the state corresponding to a signal at a D input in response to a clocking pulse at a C input.

This invention, while applicable to many data processing systems, is most readily understood in terms of a specific data processing system. For that reason, we also elect to describe this invention generally in terms of a PDP—10 Data Processing System which Digital Equipment Corporation, the assignee of this invention, manufactures and sells. We do not discuss system signals which correspond to signals in prior systems, such as control signals which the system uses to transfer data to memory locations and control signals used during the execution of normal operating instructions. A further discussion of these and other signals appear in the following Digital Equipment Corporation publications:

1. KA—10 Central Processor Maintenance Manual, Vols. 1 and 2;
2. DF—10 Data Channel Maintenance Manual, Vols. 1 and 2; and
3. U.S. Pat. No. 3,376,554 issued April 2, 1968 to the same assignee as the present invention and entitled Digital Computing System.

Figure 6:
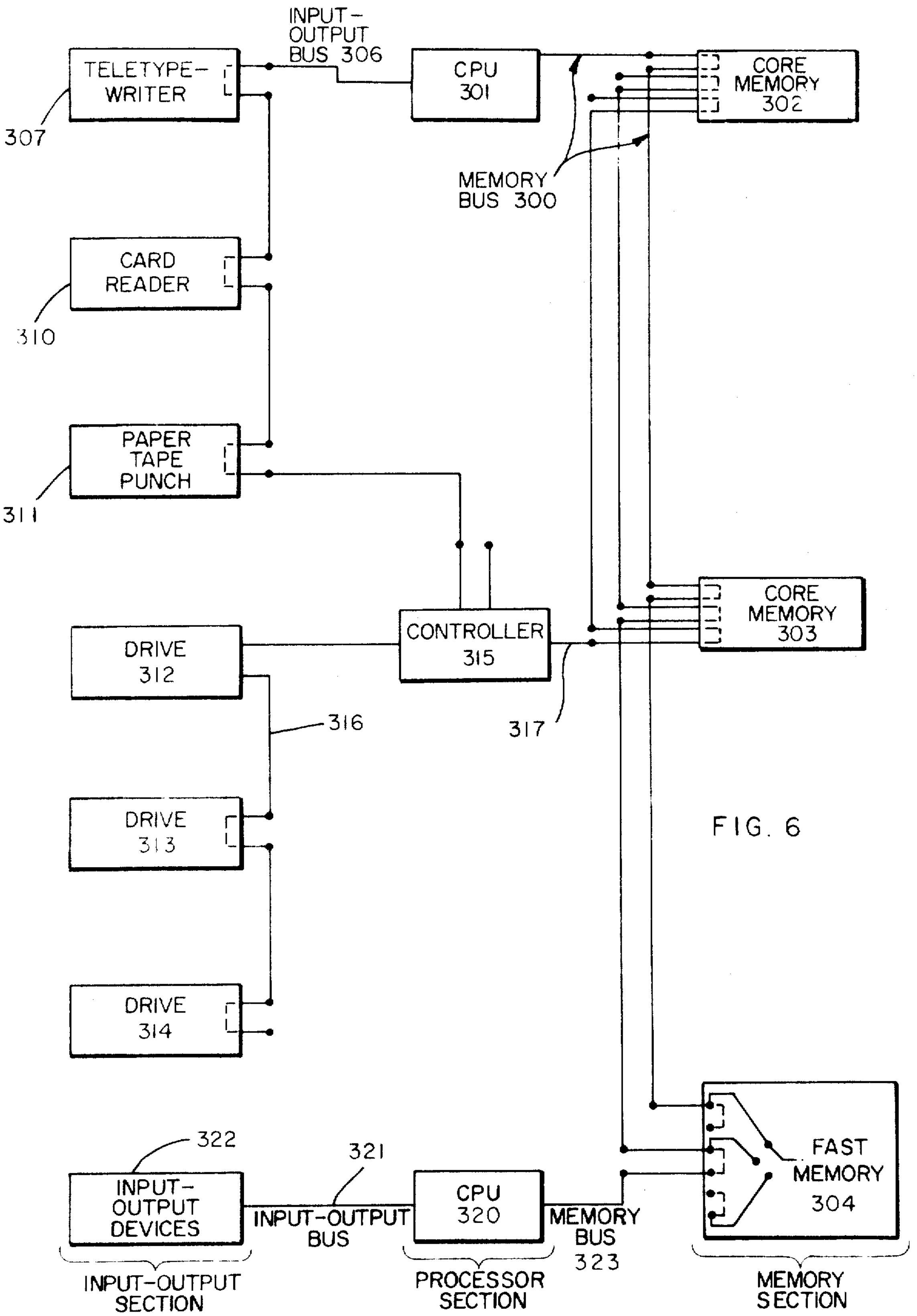
FIG. 6 is a block diagram of a data processing system adapted to use this invention.

FIG. 6 illustrates a data processing system adapted for using this invention and described in U.S. Pat. No. 3,376,554. This system contains two separate data paths and is segregated into input-output, processor and memory sections. A memory bus 300 connects a first central processor unit (CPU) 301 with a memory section including, for example, a core memory 302, a core memory 303, and a fast or volatile memory 304. An input-output (I/O) bus 306 connects the central processor unit 301 with several peripheral devices such as a teletypewriter 307, a card reader 310, and a paper tape punch 311. The memory bus 300 and the input-output bus 306 carry control, address and data in two directions. Signals on each bus are transferred in parallel, as distinguished from serial transmission.

The central processor unit 301 can also control the transfer of data between the memory section and a secondary storage facility. In FIG. 6 this storage facility comprises drives 42, 43 and 44, such as disk memory units, connected to a controller 315 by a bus 316. A controller 315 receives control information over the input-output bus 306. A data path in the controller may transfer data to the memory bus 300 or, as shown, to a second memory bus 317. As also shown in FIG. 6, a second central processor unit 320 connects through an input-output (I/0) bus 321 to other peripheral or input-output devices 322. The central processor unit 320 also connects to the memory section through a bus 323, which enables the unit 320 to use the memory units 302, 303 and 304 in common with the central processor unit 301.

Figure 1:
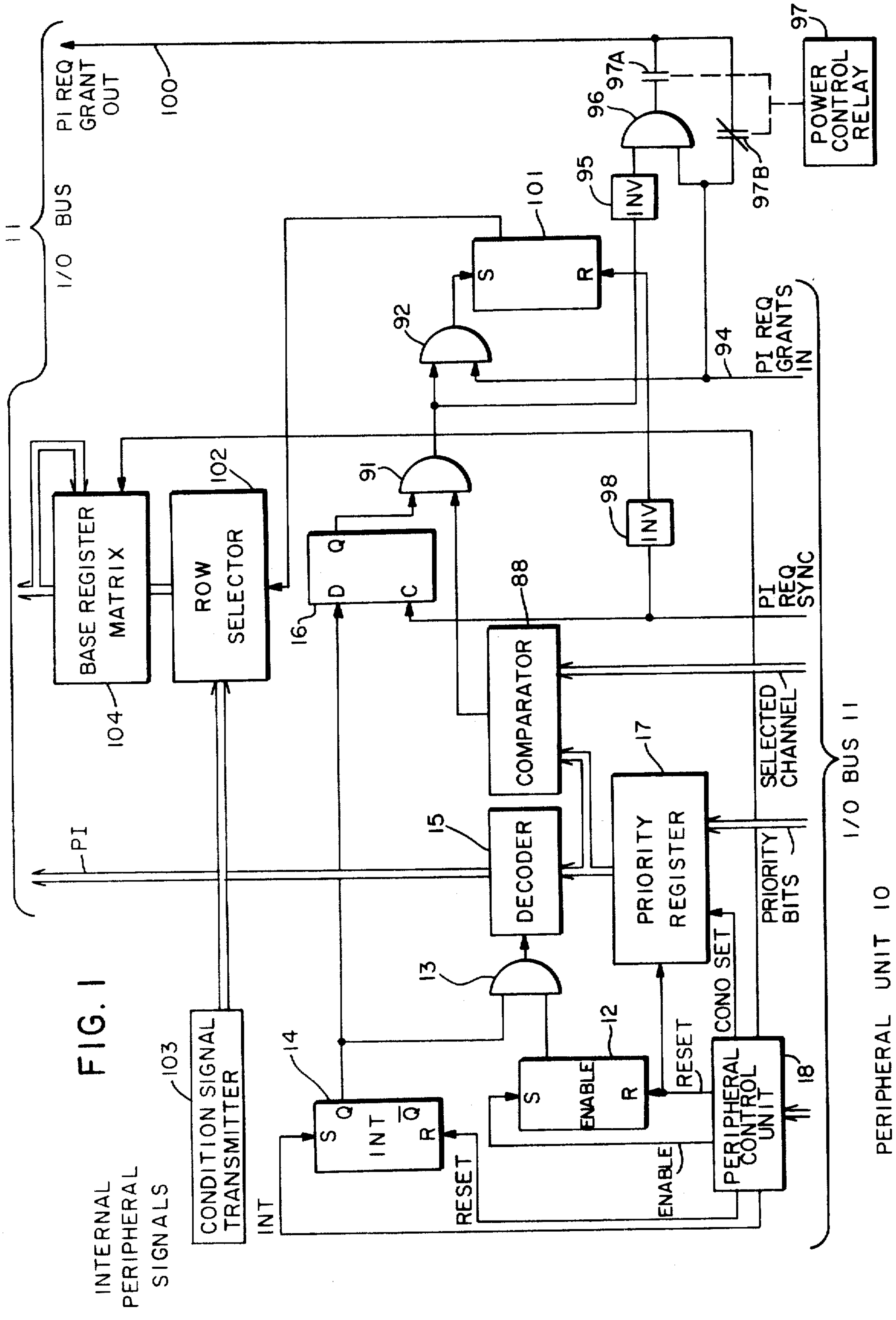
FIG. 1 schematically depicts interruption control circuitry in a typical peripheral unit incorporating this invention.

FIG. 1 shows portions of a control circuit for specific peripheral unit 10. As apparent, each other peripheral unit may contain analogous circuits. Connections from the peripheral unit 10 at the top and bottom of the FIG. 1 are made to an I/O bus 11 which, as previously indicated is a bidirectionally conducting bus with control and data wires.

Certain control signals from the I/O bus 11 are either received directly or processed by a peripheral control unit 18 to generate the various control signals shown in FIG. 1. One such set of signals controls the state of an interrupting enabling (ENABLE) flip-flop 12. When the ENABLE flip-flop 12 in a peripheral unit is set (i.e., ENABLE ← 1), an AND gate 13 can apply a signal from an interrupting (INT) latch or flip-flop 14 to a decoder 15. Resetting the ENABLE flip-flop 12 (i.e., ENABLE ← 0) disables the AND gate 13 and prevents the peripheral unit 10 from transmitting (PI) signals.

Normally the ENABLE flip-flop 12 receives an enabling signal from the peripheral control unit 18 which responds to a specific instruction identifying a specific peripheral unit and an enabling function (e.g., one of a family of CONditions Out or "CONO" instructions in a PDP—10 computer system).

Figure 4:
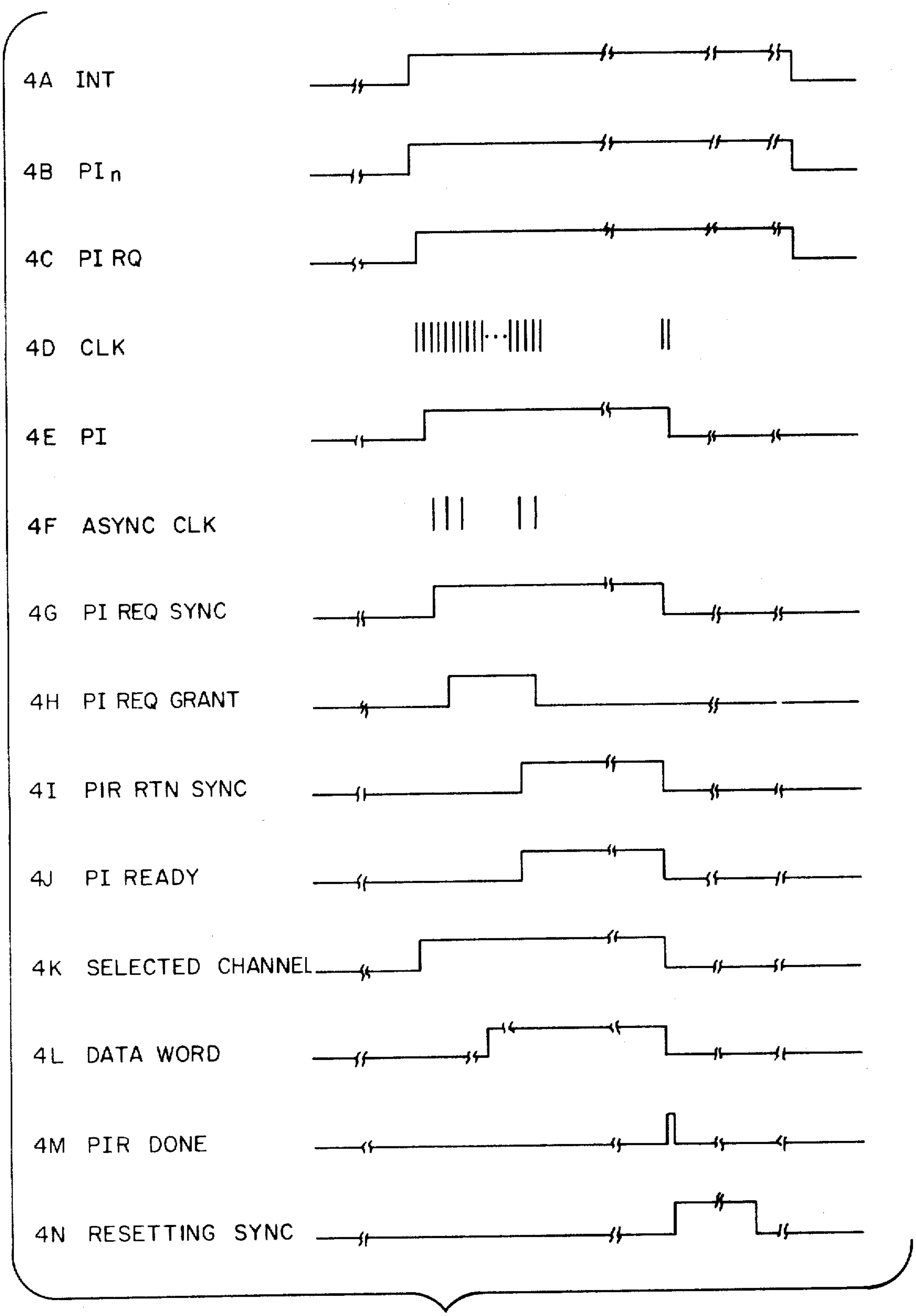
FIG. 4 is a timing diagram to show the sequence of certain signals which transfer between the central processor unit and the selected peripheral units.

Whenever it is necessary for the peripheral unit 10 to interrupt the central processor unit operations, the peripheral control unit 18 asserts an INT (FIG. 4A) signal which sets the INT flip-flop 14. When the IT flip-flop 14 sets, it enables a clocked flip-flop 16 to be set upon the subsequent receipt of a Priority Interruption REQuest SYNChronization (PI REQ SYNC) signal. No further action occurs with respect to the clocked flip-flop 16 at this time, however, Simultaneously, the signal from the set INT flip-flop 14 passes through the enabled AND gate 13 to transfer a signal from the decoder 15 onto one ($pI_n$) line of a plurality of the PI lines (FIG. 4B). Each PI line represents a specific priority level and the decoder 15 selects a particular line in response to the contents of a priority register 17.

The priority register 17 identifies the priority level assigned to its respective peripheral unit. This priority register 17 may comprise a fixed priority level number generator. In that case, no priority level changes can be made without physically altering the priority register 17. However, the priority register 17 may alternatively comprise a gated storage register responsive to PRIORITY BITS signals and a CONO SET gating signal to alter the contents of the register 17. In a PDP-10 system the central processor unit can generate such a CONO SET instruction. The PRIORITY BITS signal may comprise a number of bits that identify each priority level as a binary number. For example, three PRIORITY BITS can designate up to eight priority levels.

Once the decoder 15 asserts a PI line (hereinafter we assume it is the $PI_n$ line, where $i \geq n \geq 0$ and "$i$" is the number of possible priority levels), no further action occurs within the peripheral unit 10 except in response to signals from the central processor unit. The next sequence of events occurs within the central processor unit.

A central processor unit in a digital computer system normally processes a given instruction in a series of states which are known as "time states" or "time cycles." During each "state" the central processor unit performs a particular function or group of functions. For example, in a PDP—10 system, the central processor unit uses an "instruction" state to decode the instruction and generate effective addresses for operands, if any. This occurs when any curent instruction being processed by the central processor unit is done and the central processor unit is about reeady to process the next current program instruction. During the following "fetch" state, the central processor unit uses "memory subroutines" to retrieve operands. At this point, the central processor unit uses an "execute" state to process the operands and a "store" state to store the results, if necessary. There are two times in the sequence which are important to the understanding of this invention. The first is represented by asserting an INST FET EN signal. This signal generally is generated after the program counter is advanced during an " instruction" state. The second time, during the "store" state, is represented by an INST DONE signal which indicates that the central processor unit has finished processing an instruction. Circuits for generating these or analogous signals are well known in the art.

When the central processor unit shown in FIG. 2 receives a PI signal it uses two operational sequences to begin servicing the interruption. During a priority request sequence, the central processor unit recognizes a requesting peripheral unit and links that peripheral unit to itself in preparation for a priority interruption instruction sequence. This priority request sequence is performed asynchronously and concurrently with other central processor unit operations. Once the priority request sequence terminates, the central processor unit synchronizes the peripheral unit and enters the priority interruption instruction sequence and the actual routine which services the peripheral unit. The priority interruption instruction sequence begins at the end of any instruction provided that it was ready to begin before the INST FETCH EN signal occured for processing that instruction.

Figure 2A:
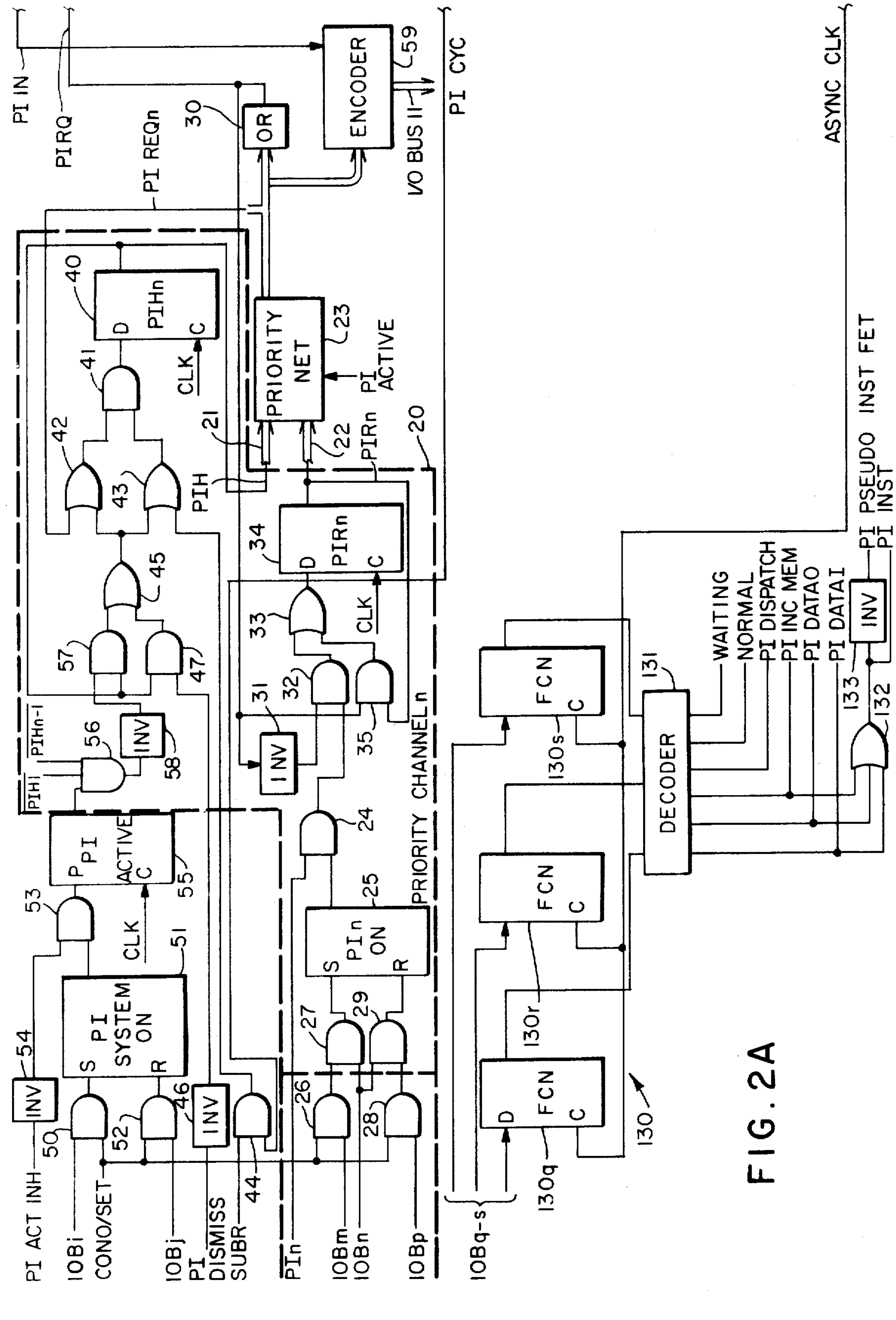
FIGS. 2A and 2B schematically depict responsive interruption control circuitry in a central processor unit.
Figure 2B:
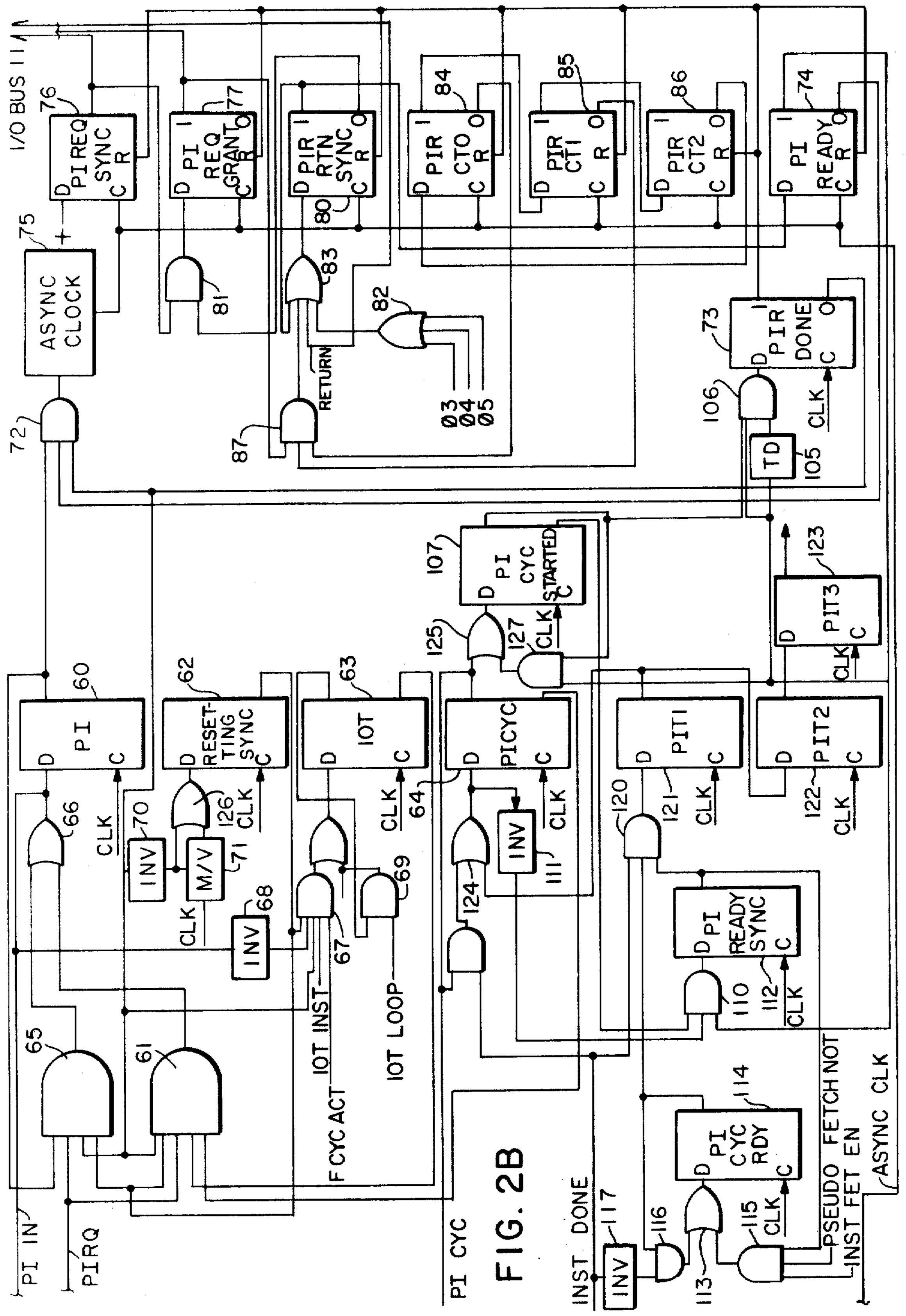

FIGS. 2A and 2B show the logical circuitry for performing such a sequence of operations in a synchronous machine under the control of a master clock (not shown) which generates CLK pulses. The flow diagrams in FIGS. 3A through 3F illustrate the flow during such a priority operation. In a decision block one branch may return directly to the input of that block. This means that, in the terms of the circuitry shown in FIG. 2, the conditions stated in the block must be satisfied before a clock pulse occurs in order for the central processor unit to branch to the next step in the operation.

Figure 3A:
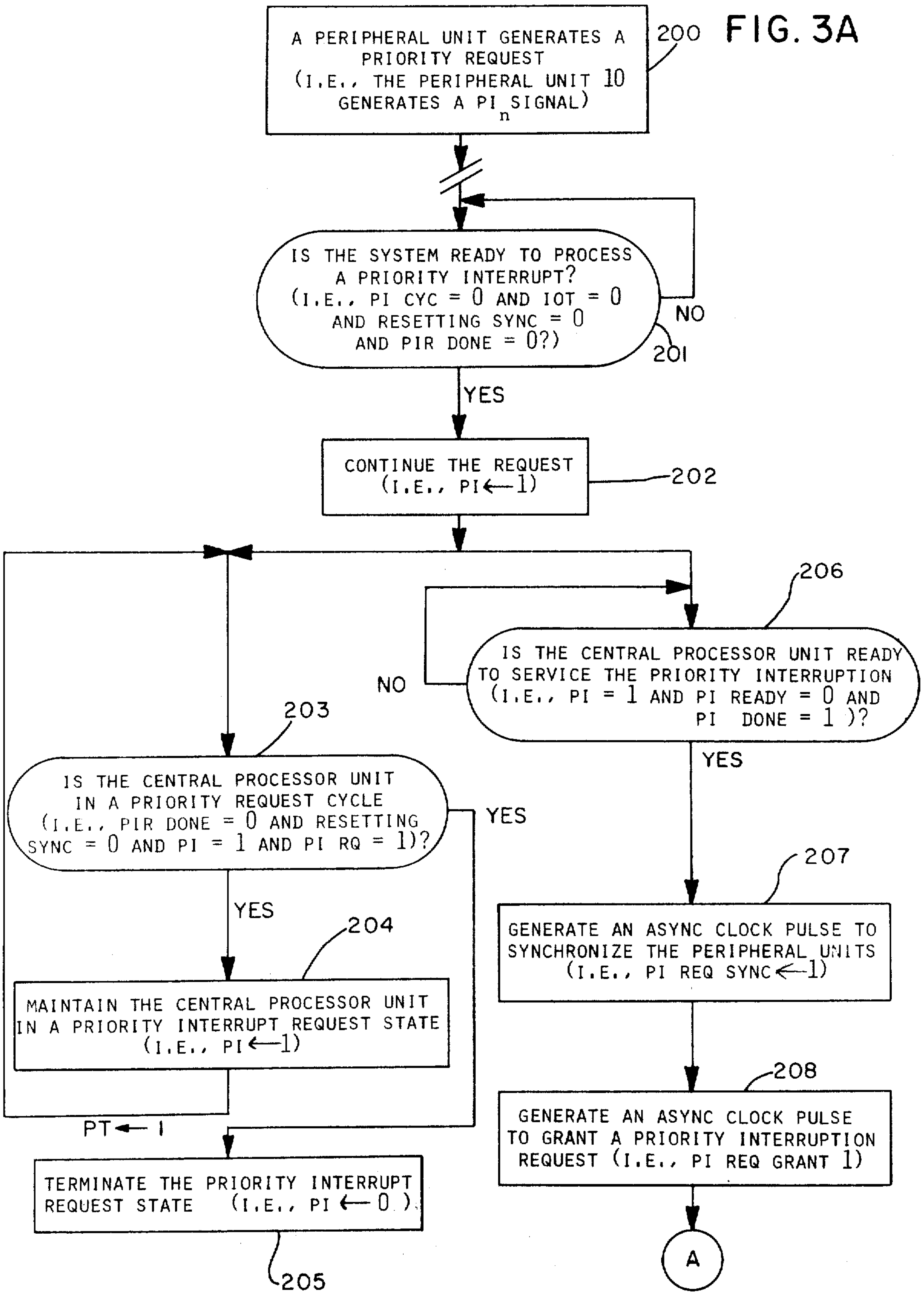
FIGS. 3A through 3F constitute a flow chart to illustrate the sequence of operations in the central processor shown in FIG. 2.
Figure 3B:
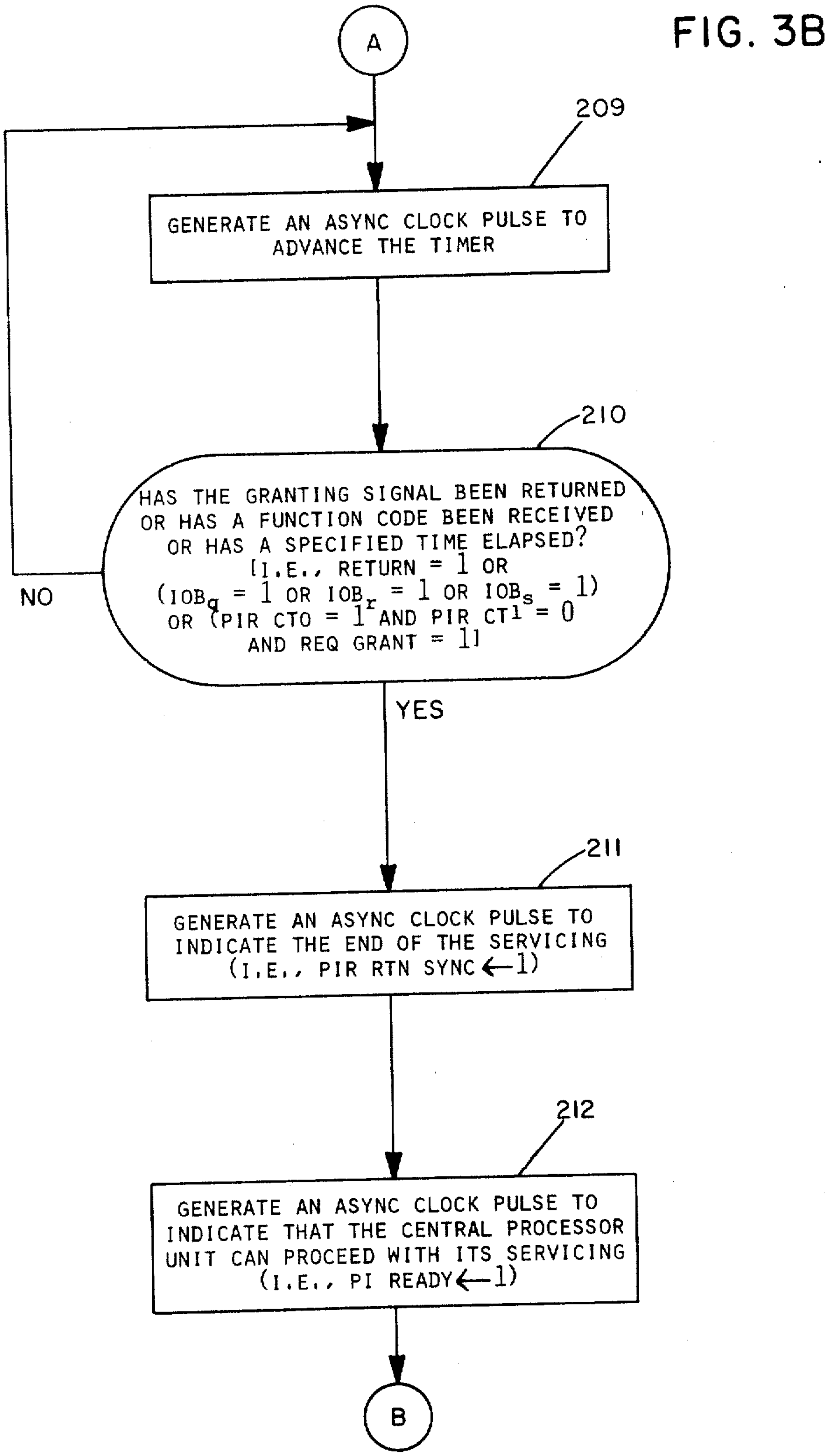

Step 200 in FIG. 3A represents the receipt of a $PI_n$ signal by the central processor unit shown in FIGS. 2A and 2B. Between the time the central processor unit receives any PI signal and the beginning of step 201, circuitry in FIG. 2A determines which priority request is to be honored, if any. A number of parallel priority channel circuits and a priority determining network perform this function. We show only a single priority channel 20 associated with the $PI_n$ line in FIG. 2A. There is one such priority channel for each of the $PI_0$ through $PI_i$ lines. Each priority channel transmits signals onto a PIH bus 21 and PIR bus 22 so that a priority net 23 can select the proper priority level and generate an appropriate Priority Interruption REQuest (PI REQ) signal.

A PIR signal indicates that there is a valid request to interrupt the current program. A PIH signal indicates that a priority request was granted and is still being processed actively or was partially processed but has been interrupted by a higher priority interruption request. So long as at least one PIH signal exists, the central processor unit is servicing a priority interruption.

Basically the priority net 23 examines the signals on the PIH bus 21 and PIR bus 22 and determines which interruption request (PI signal) it will grant. In a PDP—10 system, for example, the priority net 23 grants a request if there is no concurrent priority requests of a higher level and there are no pending interruptions being processed on the same or higher priority level. When the priority net 23 grants an interruption request, it transmits a PI $REQ_n$ signal over a PI REQ wire corresponding to the granted priority level. That is, if the priority channel 20 receives and processes a $PI_n$ signal, the priority net 23 generates a PI $REQ_n$ signal unless a higher level PI signal exists at the same time or unless the central processor unit is processing a prior priority interruption request of the same or higher priority. Whenever the priority net 23 does transmit a PI $REQ_n$ signal, the priority interruption request sequence begins, as described later.

Now referring to the details of the priority channel 20 in FIG. 2A, an AND gate 24 passes a $PI_n$ signal if the priority channel 20 is "on." Each priority channel can be turned "on" or "off" independently by controlling the state of a corresponding PI ON latch. Thus, a $PI_n$ ON latch 25 in the priority channel 20 is set to enable the AND gate 24 indicating that the priority channel 20 is on. Specifically, a CONO SET signal, derived from a CONO SET instruction, with a ONE in an $IOB_m$ bit position enables an AND gate 26. The AND gate 26 transmits signals to all the priority channels and indicates that one or more designated priority channels are to be turned on. Additional IOB bit positions individually correspond to the respective priority channels. We designate an $IOB_n$ bit position as corresponding to the priority channel 20. A CONO SET signal together with ONES in the $IOB_m$ and the $IOB_n$ bit positions enable an AND gate 27 to set the $PI_n$ latch 25.

Whenever a ONE appears in an $IOB_p$ bit position during a CONO SET instruction, a priority channel is turned off. An AND gate 28 couples this signal to all the priority channels. Within the priority channel 20 another AND gate 29 conditioned by the channel-designating $IOB_n$ bit, turns off the channel by resetting the $PI_n$ ON latch 25.

Assuming that the priority channel 20 is on, the AND gate 24 passes a $PI_n$ signal into another set of control gates which perform additional functions. First, they enable the $PI_n$ signal to reach the priority net 23 only at an appropriate time, namely any time the priority net 23 is not already transmitting a PI REQ signal indicating a present transfer of the central processor unit to a priority interruption request sequence. Secondly, once the priority channel 20 transmits a $PIR_n$ signal, the control circuits assure that the priority channel 20 continues to transmit this signal until the central processor unit begins to service this request. Specifically, an OR gate 30 is connected to receive all PI REQ signals and produce a PI RQ output signal whenever the priority net 23 generates any PI REQ signal. The PI RQ signal indicates that the central processor unit should start a priority interruption request sequence. So long as a PI RQ signal is asserted, an inverter 31 blocks the passage of any $PI_n$ signal through the AND gate 32 and an OR gate 33 to a $PIR_n$ flip-flop 34 which transmits the $PIR_n$ signal. When no PI RQ signal exists, however, the AND gate 32 can pass a $PI_n$ signal to the $PIR_n$ flip-flop 34 so that the flip-flop 34 sets on a subsequent CLK pulse.

The $PIR_n$ flip-flop 34 remains set for some additional time because the priority net 23 transmits a PI RQ signal before the next CLK pulse. The flip-flop 34 then remains set because the output from the OR gate 30, that is the PI RQ signal, enables an AND gate 35, which also receives the asserted output of the $PIR_n$ flip-flop 34, to feed the output back to the input of the $PIR_n$ flip-flop 34. Hence, the $PIR_n$ flip-flop 34 remains set through successive CLK pulses until a time at which priority net gate 23 and OR gate 30 no longer transmit a PI RQ signal and there is no longer a $PI_n$ signal being applied to the priority channel 20.

As previously indicated, there is a PIH signal on the bus 21 whenever the central processor unit is servicing an interruption. Referring to the priority channel 20, a PI $REQ_n$ signal generated by the priority net 23 will set a $PIH_n$ flip-flop 40 if certain conditions exist. As described later, there are two ways a given priority request can be serviced. In a conventional approach the central processor unit interrupts the current program and transfers to an interruption routine. During this transfer, the $PIH_n$ flip-flop 40 is set.

The control gates for setting the $PIH_n$ flip-flop 40 comprise an AND gate 41 which receives, as one input, the PI $REQ_n$ signal through an OR circuit 42. An OR gate 43 provides the other input when an AND gate 44 is energized by a SUBR signal indicating that the central processor unit is transferring to a subroutine and a PI CRC signal indicating that the central processor unit has begun the priority interruption instruction sequence. Hence, the AND gate 44 produces an output indicating that the central processor unit is transferring its operations to an interruption routine. When this condition exists concurrently with a PI $REQ_n$ signal, the next CLK pulse sets the $PIH_n$ flip-flop 40.

As already indicated, setting the $PIH_n$ flip-flop 40 does not occur until the priority interruption instruction sequence begins. When it does occur, however, the priority net 23 receives PIR and PIH signals of the same level and, as previously indicated, the priority net 23 stops transmitting the corresponding PI REQ signal. As a result the PI RQ signal goes off, thereby enabling the gate 32. However, the net 23 will not respond to any request from this channel or any lower priority channel until the $PIH_n$ flip-flop 40 is reset.

In order to reset the $PIH_n$ flip-flop 40, both inputs to an OR gate 45 must be disabled. This occurs when the central processor unit finishes an interruption routine for the corresponding level. One input for the OR gate 45 is disabled by a PI DISMISS signal. The central processor unit generates a PI DISMISS signal at the end of each interruption routine. An inverter 46 couples this signal to an AND gate 47, thereby disabling that gate. The other input to that gate is the PIH, signal from the $PIH_n$ flip-flop 40. The generation of the PI DISMISS signal merely indicates that some interruption routine has terminated, but does not identify the specific one. However, interrupting channels that the system has just finished servicing has to be the priority channel having the highest level channel in which a PIH flip-flop is set. This highest priority level flip-flop is determined by having each priority channel examine the condition of all the higher priority PIH flip-flops while the entire priority interruption system is turned on.

The same CONO SET instruction which turns individual priority channels on and off can also turn the entire priority interruption system on or off by including a ONE in an $IOB_i$ bit position. The resulting signals energize an AND gate 50 which sets a PI SYSTEM ON latch 51. A CONO SET instruction with a ONE in an $IOB_j$ bit position energizes an AND gate 52 to reset the latch 51 thereby turning off, the entire priority interruption system. Whenever the PI system is turned on, an AND gate 53 monitors the central processor unit operation for a time period during most operations when the entire PI system should be temporarily inactivated by responding to a PI ACT INH signal. An inverter 54 couples the PI ACT INH signal to the second input of the AND gate 53. So long as there is no PI ACT INH signal, CLK pulses keep a PI ACTIVE flip-flop 55 set. This flip-flop provides a PI ACTIVE signal.

Both the priority net 23 and all the priority channels receive the PI ACTIVE signal. In the priority channel 20, an AND gate 56 receives, the PI ACTIVE signal. The other inputs to the AND gate 56 are the reset outputs on the PIH flip-flops having a higher priority. If the PI system is active and all the higher priority PIH flip-flops are reset, the output of AND gate 56, coupled through an inverter 58, disables an AND gate 57 whose other input is the set output of the $PIH_n$ flip-flop 40. Hence, if the $PIH_n$ flip-flop 40 is set and no higher priority PIH flip-flops are set at the time the central processor unit generates a PI DISMISS signal, both inputs to the OR circuit 45 are disabled. This means that the interruption routine corresponding to a $PI_n$ signal has been serviced by a subroutine and the $PIH_n$ flip-flop 40 resets. It is not until this occurs that the priority net 23 can recognize any subsequently transmitted PI signals on the corresponding priority level.

Once these initial operations are completed, as indicated by the transmission of a PI RQ signal from the OR gate 30 (FIG. 4C), the central processor unit begins its priority request sequence starting with step 201 in FIG. 3A. The sequence begins whenever a PI flip-flop 60 (FIG. 2B) sets in response to a signal generated by an AND gate 61 which also receives signals from a RESETTING SYNC flip-flop 62, an IOT flip-flop 63, a PI CYC flip-flop 64 and a PIR DONE flip-flop 73. If these last four flip-flops are all reset, the central processor unit is not in a priority interruption cycle, the I/O bus 11 is not involved in an IOT instruction (i.e., one of a special class of input/output operating instructions which also move data over the I/O bus), a previous priority request sequence is not just finished and any time interval following bus use in which the bus is discharging is past. When these conditions exist, an AND gate 65 is disabled, but the AND gate 61 is energized, and its output signal passes through an OR gate 66 as a PI IN signal so the next CLK (FIG. 4D) sets the PI flip-flop 60 (FIG. 4E). This corresponds to step 202 in FIG. 3A.

The IOT flip-flop 63 sets while the I/O bus 11 is in use with an IOT instruction. An IOT INST signal, which designates an IOT operation, is one of several signals which energize an AND gate 67. The others are an inverted PI IN signal from the OR gate 66 supplied by an inverter 68, a reset signal from the RESETTING SYNC flip-flop 62 indicating a settling interval is over, and an F CYC ACT signal. The F CYC ACT signal appears at the start of an IOT instruction "fetch" state. Once set an AND gate 69 maintains the IOT flip-flop 63 in the set state by means of a signal, such as an IOT LOOp signal which the central processor unit generates until the I/O bus actually is used during the IOT instruction.

An inverter 70 and a monostable multivibrator 71 provide an input to the RESETTING SYNC flip-flop 62 through an OR gate 126 in response to a signal from the PIR DONE flip-flop 73 which also provides an input to an AND gate 72. If the PIR DONE flip-flop 73 is set, the inverter 70 enables the next CLK pulse to start the monostable multivibrator 71. While the multivibrator 71 is active, CLK pulses keep the RESETTING SYNC flip-flop 62 set.

Hence, once the PI flip-flop 60 sets, operations can essentially divert from those defined in step 203 (FIG. 3A) through the "yes" branch until the PIR DONE flip-flop 73 sets, as described later. When this occurs, the inputs to the AND gate 65 enable the PI flip-flop 60, to remain set (step 204). Otherwise, the PI flip-flop 60 resets (step 205) indicating the end of a priority request sequence.

When the PI flip-flop 60 sets, it enables the AND gate 72, which is additionally energized if the PIR DONE flip-flop 73 and a PI READY flip-flop 74 are both reset. When these conditions exist, the AND circuit 72 enables an asynchronous clock 75 to produce a sequence of ASYNC CLK pulses (FIG. 4F) which control the transfer of other signals onto the I/O bus 11. This clock, which is separate from the master clock, controls the basic operations during the priority request sequence. Step 206 (FIG. 3A) defines the conditions which start the asynchronous clock 75. It represents the first step in a series of operations which run concurrently with the operations steps 203 through 205 define. Once these operations start, the first asynchronous clock pulse sets the PI REQ SYNC flip-flop 76 (step 207) and a PI REQ SYNC signal (FIG. 4G) passes onto a corresponding control wire in the I/O bus 11.

The next pulse from the asynchronous clock 75 sets a PI REQ GRANT flip-flop 77 (FIG. 4H) when a PIR RTN SYNC flip-flop 80 is reset and the PI REQ SYNC flip-flop 76 is set, those conditions being monitored by an AND gate 81. When the PI REQ GRANT flip-flop 77 sets it transmits a PI REQ GRANT signal onto the I/O bus 11. Thereafter the asynchronous clock 75 continues to generate pulses until the PIR RTN SYNC flip-flop 80 sets. Any one of several conditions can set the PIR RTN flip-flop 80. IN most cases, a non-zero function code appears on the I/O bus 11 and the existance of a logical ONE on any of the three function code wires causes an OR gate 82 and an OR gate 83 to provide an assertive input to the PIR RTN SYNC flip-flop 80. If there are no such function code signals, one of two other conditions will set the flip-flop 80. In order to insure the integrity of the system, the wire leading from the PI REQ GRANT flip-flop 77, which passes through all peripheral units in sequence, may return directly as the RETURN line to the OR circuit 83. Therefore, if the system starts a priority request sequence and the PI REQ GRANT signal is not blocked by any peripheral unit, it comes back on the RETURN line to set the PIR RTN SYNC flip-flop 80.

As a third alternative, the circuit in FIG. 2B contains a counter comprising a PIR CTO flip-flop 84, a PIR CT1 flip-flop 85 and a PIR CT2 flip-flop 86. As shown in step 209 (FIG. 3B), each pulse from the clock 75 advances the counter. An AND circuit 87, enabled when the PIR REQ GRANT flip-flop 77 sets, monitors the counter. When a predetermined count is reached, the AND gate 87 energizes the OR gate 83, so the PIR RTN SYNC flip-flop 80 sets. In this way, the circuitry in FIG. 2B assures that the PI RTN SYNC flip-flop 80 sets (FIG. 4I) and that the priority request sequence continues.

Once any one of these tests are satisfied (step 210), the next asynchronous clock pulse from the clock 75 sets the PIR RTN SYNC flip-flop 80 (step 211). A succeeding asynchronous clock pulse sets the PI READY flip-flop 74 (step 212 and FIG. 4J). When the PI READY flip-flop 74 sets, it disables the AND circuit 72, and no more ASYNC CLK pulses are generated.

Now referring to FIGS. 1 and 2B, when the OR gate 66 in FIG. 2B is energized and transmits the PI IN signal, SELECTED CHANNEL bits from an encoder 59 (FIG. 2A) pass onto the I/O bus 11 (FIG. 4K). These bits are received in each peripheral unit 10 (FIG. 1) in a comparator 88. All the comparators, which indicate a correspondence between the priority levels defined by their associated priority requests and the priority level the SELECTED CHANNEL bits define, enable gates equivalent to an AND gate 91. The PI REQ SYNC signal acts as a clocking pulse for the flip-flop 16 thereby setting that flip-flop if the flip-flop 14 is set and energizing the AND gate 91. Whenever an AND gate like the AND gate 91 is energized, it means that the corresponding peripheral unit has made a priority request at the priority level now being granted. As a result, all AND gates, equivalent to an AND gate 92, in those peripheral units are enabled.

The next signal the peripheral unit 10 receives is the PI REQ GRANT signal on an input conductor 94 which passes through all the peripheral units in sequence regardless of their priority. If AND gates, like the AND gate 91, are not energized, the peripheral unit merely passes the signal onto the next peripheral unit in sequence. In FIG. 1, the circuitry which passes the signal comprises an inverter 95 which enables an AND gate 96 to pass the PI REQ GRANT signal through a set of contacts 97A under the control of a power control relay 97 to a PI REQ GRANT output conductor 100 which connects to the next peripheral unit in line. In addition to the NO contacts 97A, the power control relay 97 also has NC contacts 97B in parallel with the AND circuit 96 and the NO contacts 97A for connecting the input conductor 94 directly to the output conductor 100 in case the peripheral unit is turned off.

Assuming that the AND gate 91 is energized, the AND gate 96 is disabled by the inverter 95, so the PI REQ GRANT signal cannot pass beyond this peripheral unit. Moreover, with the AND gate 92 enabled, the PI REQ GRANT signal sets a latch 101 to thereby apply an input signal to a row selector 102.

Internally generated CONDITION signals from a transmitter 103 in the peripheral unit indicate the nature of the interruption. The row selector 102 selects a particular row in a base address register matrix 104 in response to the latch 101 being set. As a result, the matrix 104 transmits a particular interruption data word onto the I/O bus 11 (FIG. 4L). The central processor unit uses this interruption data word to control subsequent operations.

A specific format in this interruption data word is shown in FIG. 5. It includes a three-bit byte (bits 0–2) to designate the selected channel or general priority level, a three-bit byte (bits 3–5) to identify the function to be performed, a 12 bit address increment (bits 6–17) and an 18 bit address byte (bits 18–35).

As previously indicated a "000" function code in the interruption data word indicates that no peripheral unit has responded to the PI REQ GRANT signal. It means that the central processor unit is awaiting a reply and eventually causes the central processor unit to use some type of back-up routine such as a polling routine. This feature enables peripheral units not incorporating this invention to be intermixed with peripheral units using the invention, assuming all other characteristics are compatible. Other function codes may also produce conventional interruption operations. For example, an "001" code starts an interruption routine at an address which is dependent upon the priority. A "010" code starts the interruption routine at an address specified by the address byte. There are the routines which also cause a PIH flip-flop in a priority channel to set.

Other functions are also available which speed system operation. For example, a "011" code causes the central processor unit to add the signed increment to the contents of a location designated by the address byte. Codes "100" and "101" provide an advantage by servicing the interruption without having to perform any of the steps normally associated with an interruption routine. If the peripheral unit is receiving data from a series of locations, a "100" function code causes the central processor unit to immediately load onto the I/O bus 11, without any polling operations, the data stored at the memory identified by the address byte. Similarly with a "101" code the address identifies a memory location which is to store data from the peripheral unit. In both these cases the central processor unit performs the appropriate memory subroutine directly in response to the function codes.

Now referring back to FIG. 2B, setting the PI READY flip-flop 74 indicates that the priority request sequence can start its termination operation and that a priority interruption instruction sequence (hereinafter a "PI instruction sequence") can begin. However, setting the PI READY flip-flop 74 does not set the PIR DONE flip-flop 73 immediately. A time delay circuit 105 is in circuit with one input to an AND circuit 106; hence, this delay must elapse before the PIR DONE flip-flop 73 sets. This time delay is represented in FIG. 3C by step 213; during this time delay, the operations listed in steps 214 through 222 may occur.

Step 215 is the first step in an initial portion of the PI instruction sequence. An AND circuit 110 (FIG. 2B) receives one signal from an inverter 111 which indicates whether the system is about to begin a previously started PI cycle. When a PI CYC STARTED flip-flop 107 is reset, it enables the AND gate 110 as does the PI READY flip-flop 74 when set. When all these signals energize the AND circuit 110, a PI READY SYNC flip-flop 112 sets on the next system CLK pulse. When the PI RDY SYNC flip-flop 112 sets (step 216), essentially no further steps in the PI instruction sequence can occur without using the various register and arithmetic elements in the central processor unit. While the prior steps in the priority request sequence and PI instruction sequence are performed concurrently with steps in the current program, following steps must be performed in synchronism with these other elements of the central processor unit. Hence, the PI instruction sequence operation pauses until a PI CYC RDY flip-flop 114 sets.

Figure 3C:
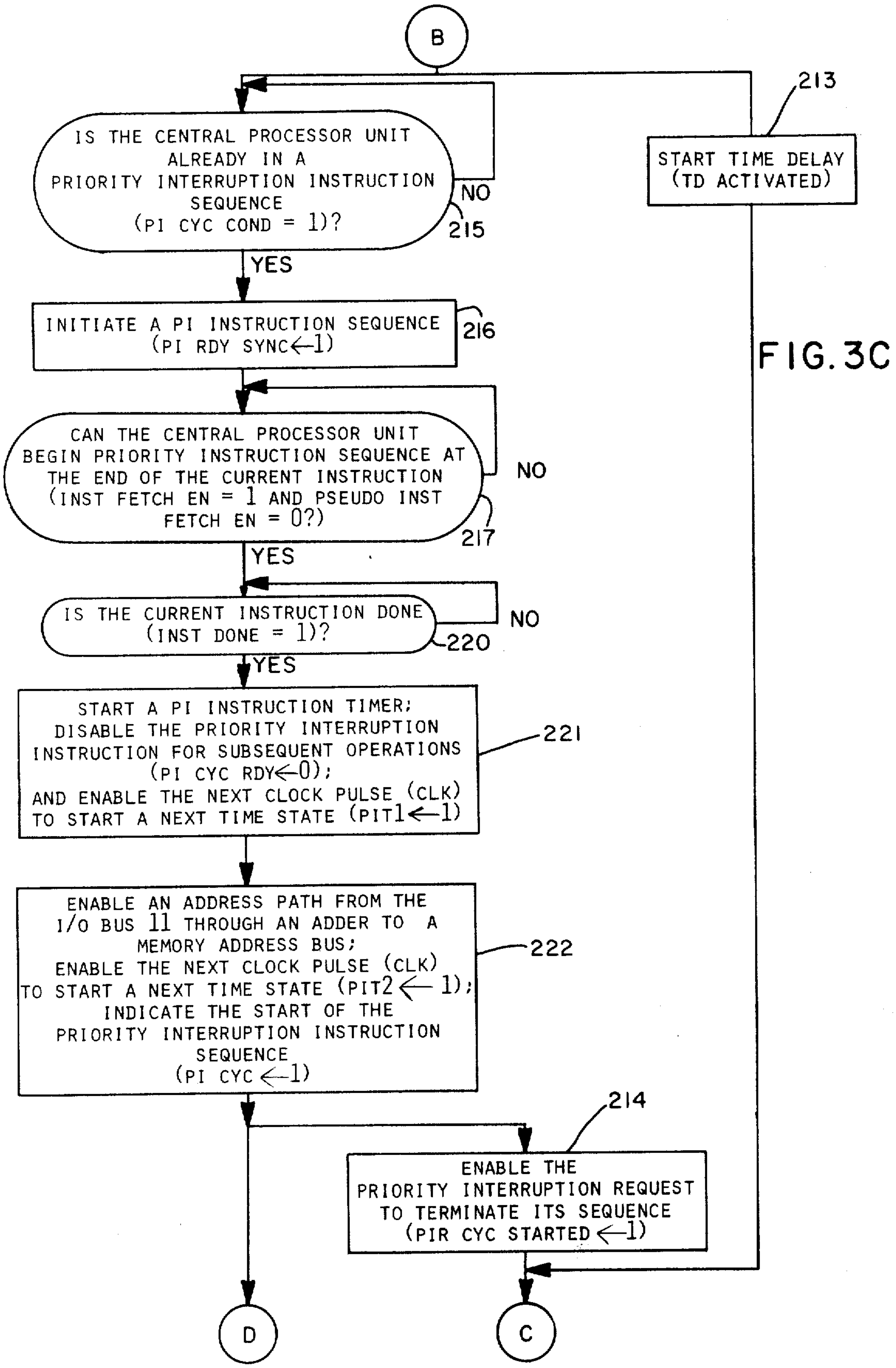

Referring to step 217 in FIG. 3C, normally an AND gate 115 (FIG. 2B) receives the INST FET EN signal and a PSEUDO FETCH NOT signal from other timing and control circuits in the central processor unit together with the set output of the PI RDY SYNC flip-flop 112. The INST FET EN signal identifies one of the previously discussed times during the execution of an instruction in the current program. At the time the INST FET EN signal, the program counter has been advanced to point to the new instruction in the current program. Hence, the central processor unit can store the program counter contents and return to the current program at the proper location. As described later, certain operations generate a PSEUDO FETCH signal and its complement, the PSEUDO FETCH NOT signal. No PI instruction sequence can begin during such operations, so an AND gate 115 is disabled during them to block any response to a INST FET EN signal occurring during a PSEUDO FETCH operation.

When the PI CYC RDY flip-flop 114 sets, it remains set until an INST DONE signal is generated. An AND gate 116 receives the set output signal from the PI CYC RDY flip-flop 114 and the complement of the INST DONE signal which an inverter 117 provides. Hence, successive CLK pulses keep the PI CYC READY flip-flop 114 set until the current program instruction has been executed. When the central processor unit issues the previously discussed INST DONE signal (step 220), an AND gate 120 is immediately energized so the next CLK pulse sets a PIT1 flip-flop 121. The same CLK pulse resets PI CYC RDY flip-flop 114 (step 221). The PIT1 flip-flop 121, a PIT2 flip-flop 122 and a PIT3 flip-flop 123 constitute a PI instruction timer. Step 221 (FIG. 3C) is the first in a series of steps which move the interruption data word to the central processor unit. During a PIT1 time state, when the PIT1 flip-flop 121 (FIG. 2B) is set, the operations defined in step 222 occur. As previously indicated, the PI REQ GRANT signal is still asserted, so the interruption data word from the selected peripheral unit is still on the I/O bus 11. Therefore, during the step 222 the central processor unit establishes a path from the I/O bus 11 through an adder in the central processor unit and to a memory address bus. At the same time the PIT1 signal passes through an OR gate 124 so the next CLK pulse sets the PI CYC flip-flop 64 to indicate the actual start of the PI instruction sequence. This pulse also sets the PIT2 flip-flop 122.

Setting the PI CYC flip-flop 64 enables the central processor unit to terminate the priority request sequence concurrently with the PIT2 and PIT3 time states. In step 214, the PIR CYC STARTED flip-flop 107 sets in response to the PI CYC flip-flop 64 which energizes an OR gate 125, the PIR CYC STARTED flip-flop 107 acting as a control for the priority request sequence circuitry. Once set, the PI CYC STARTED flip-flop 107 remains set until the PI READY flip-flop 74 resets as an AND gate 127 receives signals from both flip-flops.

Figure 3D:
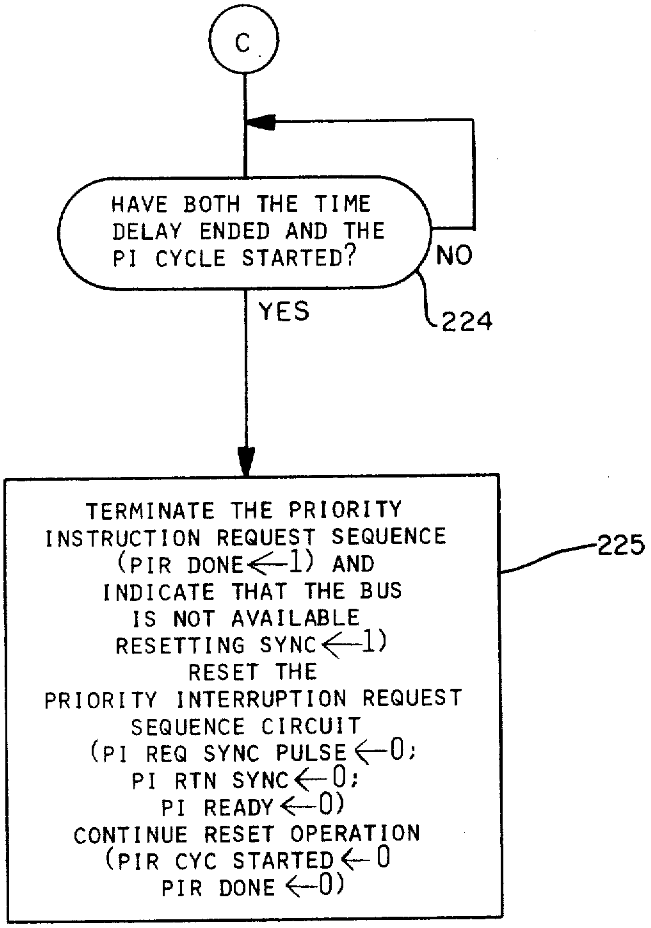

Now analyzing the termination of the priority request sequence first, and assuming that step 224 in FIG. 3D senses that the time delay circuit 105 has timed its interval and that the PI CYC STARTED flip-flop 107 is set, the AND gate 106 is energized and the next CLK pulse sets the PIR DONE flip-flop 73 (FIG. 4M). Setting the PIR DONE flip-flop 73 provides an overriding disabling signal at the input of the AND circuit 72 so no additional asynchronous clock pulses occur even after the PI READY flip-flop 74 resets. The inverter 70 couples a signal through the OR gate 126 so a next CLK pulse sets the RESETTING SYNC flip-flop 62 and starts a timing signal from the monostable multivibrator 71 (FIG. 4N). As a result, the RESETTING SYNC flip-flop 62 remains set for a predetermined time. Setting the PIR DONE flip-flop 73 also disables the AND gate 65 so that the next CLK pulse resets the PI flip-flop 60 (FIG. 4E). When the PIR DONE flip-flop 73 sets FIG. 4M, it directly resets the flip-flops 74 (FIG. 4J), 76 (FIG. 4G), 77 (FIG. 4H), 80 (FIG. 4I), 84, 85 and 86. When the PI REQ SYNC PULSE signal terminates (FIG. 4G), the peripheral unit stops transmitting the interruption data word (FIG. 4L) and an inverter 98 (FIG. 1) resets the latch 101. The CLK pulse which follows the resetting of the PI READY flip-flop 74 (FIG. 2B) resets the PIR CYC STARTED flip-flop 107 and the PIR DONE flip-flop 73. With both the PI READY flip-flop 74 and PIR DONE flip-flop 73 reset, a new priority request sequence can begin as the AND gate 72 is enabled to be energized if the PI flip-flop 70 sets. These operations are shown in FIG. 3D, as step 225.

Figure 3E:
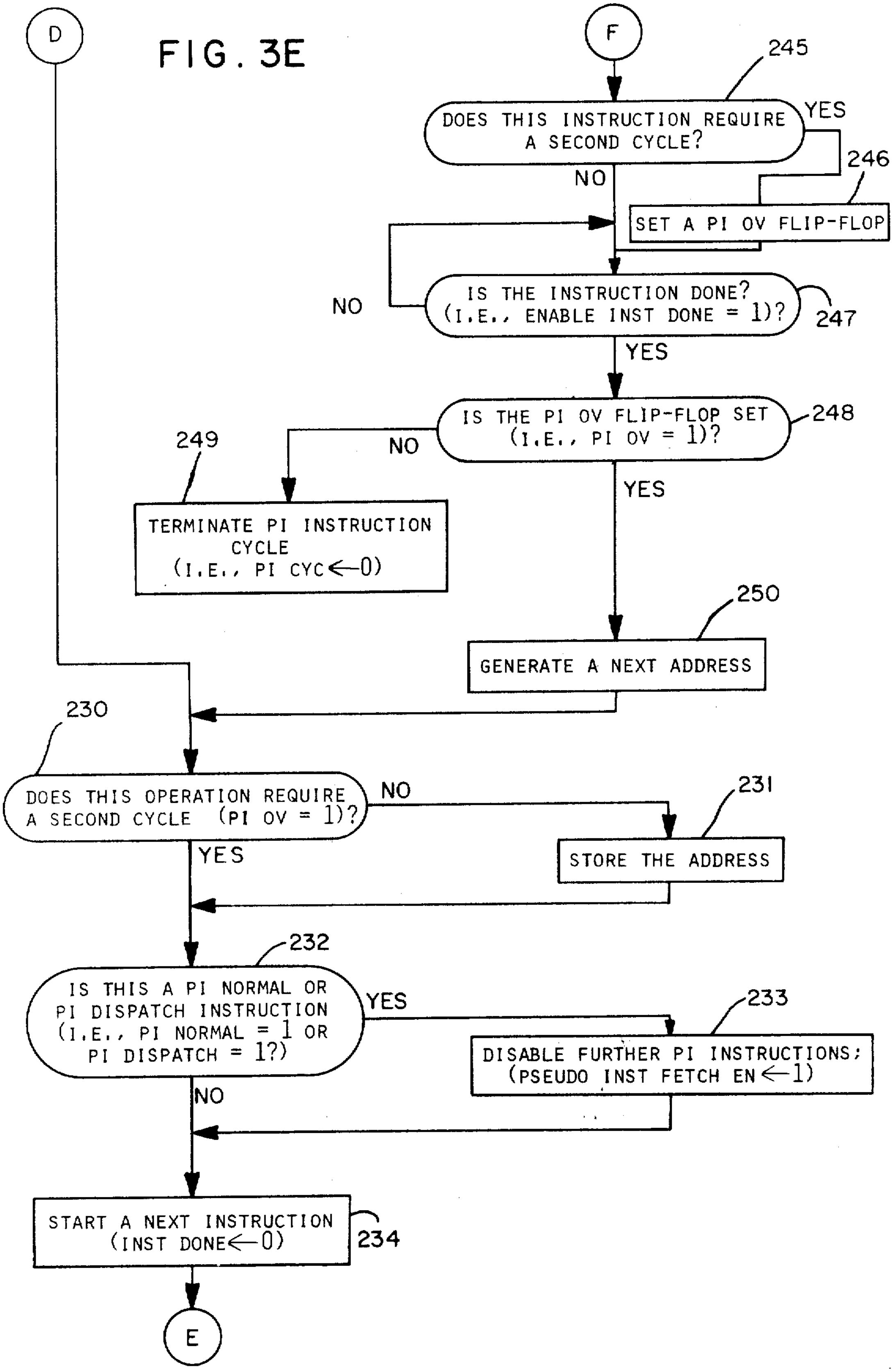
Figure 3F:
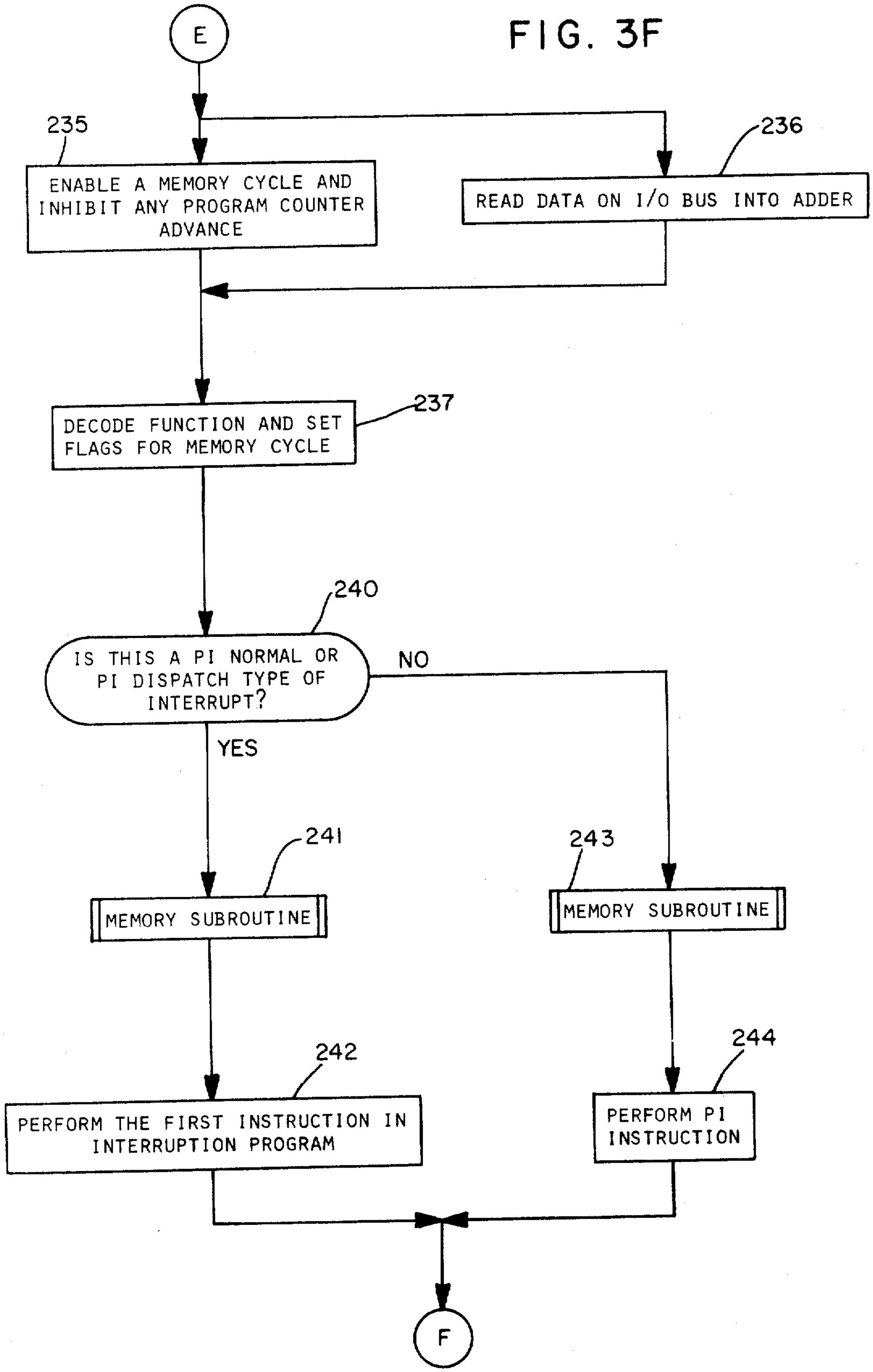

Concurrently with these steps the central processor unit begins the PIT2 time state. The first step (step 230) in this time state is represented in FIG. 3E. Although there are two ways to reach step 230, the normal sequence is from the operations defined by step 222 (FIG. 3C). Considering for the moment that the interruption is a simple one, the circuitry begins the operations by storing the address in a register for subsequent use (step 231 in FIG. 3E). If, in step 232, the central processor unit indicates that the interruption data word is a PI NORMAL or PI DISPATCH word, further PI instructions are disabled and a flip-flop (not shown) is set to generate the previously described PSEUDO FETCH signal and thereby terminates the PSEUDO FETCH NOT signal.

During the priority request sequence, each pulse from the asynchronous clock 75 clocks data on "*q*," "*r*" and "*s*" conductors of the I/O bus 11 into a register 130 (FIG. 2A) comprising clocked flip-flops **130*q*, 130*r* and 130*s*. Once the asynchronous clock 75 is disabled, the register 130 stores the transmitted function code value. A decoder 131 then generates a signal depending on the function code. In addition an OR circuit 132 responds to PI INC MEM, PI DATAO and PI DATAI signals, which are defined as priority interrupt instructions, to generate a PI INST signal. An inverter 133 generates a PI PSEUDO INST FET signal whenever the OR gate 132 generates a signal other than a PI INC MEM or PI DATAI or PI DATAO signal. Both these signals are used in other areas of the central processor unit. Then the central processor unit uses the signal from the decoder 131 to set the necessary flags for a correct memory subroutine (step 237** in FIG. 3F). In some cases a read-memory subroutine, a write-memory subroutine or both may be necessary.

Once step 237 finishes, step 240 diverts to step 241 when the decoder 131 generates a PI DISPATCH or PI NORMAL signal. After the memory subroutine ends, the central processor unit starts to process the first instruction in the interruption program or polling operation in step 242. When the central processor unit does divert from the operations of step 240 to those of steps 243 and 244, a memory subroutine performs the necessary operation; and the central processor unit performs the PI operations instruction before returning to the current (i.e. interrupted) program.

In some priority interrupts, it may be necessary to perform additional memory subroutines. As the central processor unit finishes each memory subroutine during an interruption operation, circuitry (not shown) determines whether a second cycle is necessary (step 245 in FIG. 3E). If it is, a PI OV flip-flop (not shown) is set (step 246). When the current instruction is finished (step 247), the previously discussed INST DONE flip-flop (not shown) is set (step 247) and step 248 diverts the operation depending upon whether the PI OV flip-flop is set. If it is not, then the PI CYC flip-flop 64 is reset and the PI instruction sequence finishes in step 249. If the PI OV flip-flop is set, a new address is generated (step 250) and then the central processor unit returns to step 230. Step 230 diverts directly to step 232 because the PI OV flip-flop is set.

The described interruption circuitry which constitutes our invention has several advantages. first the contents of a priority register 17 in each peripheral unit can be altered readily during the course of the program. This coupled with the serial transfer of the PI REQ GRANT signal through all peripheral units, regardless of their priority level, can provide a programmer with a more flexible priority assignment capability.

The generation of the data which identifies the interrupting peripheral unit greatly facilitates programming. Some transfers require no real programming. With peripheral units constructed in accordance with this invention, polling operations can be eliminated in many instances. However, a digital computer system can use this invention without precluding the use of peripheral units which are otherwise compatible with the system, so some conventional polling may occur with peripheral units not incorporating the invention.

It will be apparent that we have described a specific embodiment of a digital computer system. It will be equally apparent that many changes can be made to the disclosed digital computer system without departing from the essence of this invention. Threfore, it is the intent of the appended claims to cover all such variations and modifications as come within the true spirit and scope of this invention.

Therefore, what we claim as new and desired to secure by Letters Patent of the United States is:

1. A peripheral unit for use in a digital computer system including a central processor unit and an input/output bus with a plurality of wires connected thereto, said peripheral unit connected to the input/output bus for receiving and transmitting control and data signals from and onto the bus wires, certain of the received control signals including selected channel signals identifying a priority level and a request synchronizing signal and following input granting signal, said peripheral unit comprising:

A. means for transmitting a priority interruption signal onto the bus indicating a priority level, B. a comparator connected to said transmitting means and adapted to receive the selected channel signals for producing an output signal whenever said peripheral unit has requested a priority interruption at the level the selected channel signals identify.

C. an input granting signal receiver for normally coupling the input granting signal through said peripheral unit, said receiver being disabled in response to the combination of a signal from said comparator and a request synchronizing signal to thereby block the passage of the input granting signal through said peripheral unit, and D. means for transferring a digital interruption data word onto preselected bus wires when said receiver is disabled.

2. A peripheral unit as recited in claim 1 wherein the bus contains a plurality of priority interruption wires and said priority interruption signal transmitting means comprises:

i. a priority register for storing a priority number in response to another control signal and selected data signals on the bus, ii. a gated decoder responsive to an input gating signal for converting the contents of said priority register into a signal on a corresponding priority interruption wire, and iii. means for producing the input gating signal.

3. A peripheral unit as recited in claim 1 wherein said digital interruption data word means includes:

i. means for producing condition signals, ii. means for storing a plurality of interruption data words in digital form responsive to said receiver being disabled for transferring a selected one of the words onto the bus, and iii. means responsive to the condition signals for selecting the particular interruption data word.

4. A peripheral unit as recited in claim 3 wherein the bus contains a plurality of priority interruption wires, each wire corresponding to one of a plurality of priority levels, said priority interruption signal transmitting means comprising:

i. a priority register for storing a priority number in response to another control signal and selected data signals on the bus, ii. a gated decoder responsive to an input gating signal for converting the contents of said priority register into a signal on a corresponding priority interruption wire, and iii. means for producing the input gating signal.

5. A peripheral unit as recited in claim 4 wherein the digital computer system additionally includes a memory unit comprising a plurality of addressed locations, the signals from said interruption data word means being grouped to indicate a function to be performed and an address in the memory unit.

6. A peripheral unit as recited in claim 5 wherein the central processor unit includes means for generating data and control signals for enabling and inhibiting the transmission of priority interruption signals onto the bus and wherein said peripheral unit additionally includes enabling means connected to said priority interruption signal transmitting means to enable or disable said priority interruption signal transmitting means in response to the predetermined enabling and inhibiting data and control signals.

7. A central processor unit for use in a digital computer system with a central processor unit, and a plurality of peripheral units and an input/output bus with control and data lines connected to said processor and the peripheral units, each peripheral unit having means for transmitting priority interruption signals over one of a plurality of interruption signal wires in the bus, said central processor unit comprising:

A. priority determining means connected to the priority interruption wires for selecting a priority interruption signal including means for transmitting selected channel signals corresponding to the priority level being granted onto predetermined bus wires, B. a priority request circuit including:

i. a clock enabled by said priority determining means, ii. means responsive to a first pulse from said clock for producing a request synchronizing signal on a bus control wire, and iii. means responsive to a subsequent pulse from said clock for producing an input granting signal on another bus control wire, and C. a priority interruption instruction circuit responsive to completion of said processing in said priority request circuit and conditions in said central processor unit for receiving data on the bus wires for use in subsequent central processor unit operations.

8. A central processor unit as recited in claim 7 wherein received signals on certain bus wires define a function, said central processor unit additionally comprising:

A. a function register responsive to said clock for storing the function signals, and B. means responsive to data in said function register for generating internal control signals for use by said central processor unit.

9. A processor as recited in claim 8 wherein said priority request circuit includes termination means responsive to another pulse from said clock for disabling said clock and for indicating said priority request circuit has processed the priority interruption signal, said termination means including:

a. a counter driven by said clock, b. means monitoring signals on the function data lines, and c. means responsive to signals from said counter and said monitoring means for enabling said termination means.

10. A central processor unit as recited in claim 9 wherein said priority interruption instruction circuit comprises:

i. first means for synchronizing said circuit to normal central processor unit instruction operations, and ii. means responsive to said first means and the end of an instruction operation for enabling said priority interruption instruction circuit.

11. A central processor unit as recited in claim 10 wherein said priority determining means includes an input channel for each priority level, each input channel including means for disabling itself.

12. A digital computer system comprising:

A. a bus having control and data wires,

B. a central processor unit comprising:
  i. priority determining means connected to first control wires for granting a priority interruption signal, said priority determining means including means for transmitting signals onto first predetermined bus data wires corresponding to the priority level being granted
  ii. a priority request circuit including
    a. a clock enabled by said priority determining means,
    b. means responsive to a first pulse from said clock for transmitting a request synchronizing signal onto a second bus control wire, and
    c. means responsive to said clock for transmitting an input granting signal onto a third bus control wire, and
  iii. a priority interruption instruction circuit responsive to completion of a priority interruption request sequence and to conditions in said central processor unit for receiving data on second data lines, and
C. a plurality of peripheral units, at least one peripheral unit including:
  i. means for transmitting a priority interruption signal onto one of said first control wires indicating one of a plurality of priority levels,
  ii. a comparator connected to said priority interruption signal transmitting means and adapted to receive signals on said first data wires including a granted priority level, said comparator generating an output signal whenever said peripheral unit has requested a priority interruption at the same level of priority being granted, and
  iii. an input granting signal receiver connected to said third control wire for coupling an input granting signal through said peripheral unit, said receiver being disabled in response to a signal from said comparator and a request synchronizing signal to thereby block the passage the input granting pulse through said peripheral unit, and
  iv. means for transmitting a digital interruption data word onto the second data wires for transfer to said central processor unit.

13. A digital computer system as recited in claim 12 wherein said bus contains a plurality of said first control wires, said priority interruption signal transmitting means in said peripheral unit comprising:
  a. a priority register for storing a priority number in response to signals on a fourth control wire and selected data signals on predetermined data lines,
  b. a gated decoder responsive to an input gating signal for converting the contents of said priority register into a signal on a corresponding one of said first control lines, and
  c. means for producing the input gating signal.

14. A digital computer system as recited in claim 13 wherein:
A. said peripheral unit additionally comprises
  i. means for generating condition signals.
  ii. means for storing a plurality of digital interruption data words being responsive to said receiver being disabled for transmitting a selected one of the words over said bus, and
  iii. means responsive to the condition signals for selecting the digital interruption data word to be transmitted, and
B. said central processor unit comprising:
  i. a function register responsive to said clock for storing portions of the digital interruption data word, and
  ii. means responsive to the data in said function register for producing control signals for use by said central processor unit.

15. A digital computer system as recited in claim 14 wherein said input granting receivers in each peripheral unit are connected in series, said input granting signal from said central processor unit being coupled to a first receiver, said system additionally comprising a fifth bus control wire being connected to receive a signal passed through the last peripheral unit, said priority request circuit including termination means in said central processor unit responsive to said clock for disabling said clock to thereby indicate said priority request circuit has processed a priority interruption signal, said termination means including:
A. a counter driven by said clock,
B. means monitoring the function signals,
C. means responsive to signals from said counter, said monitoring means and said fifth wire for enabling said termination means.

16. A digital computer system as recited in claim 15 additionally including a memory unit comprising a plurality of addressed locations, said signals from said digital interruption data word means being grouped indicating a function to be performed and an address in said memory unit, said priority interruption instruction circuit additionally comprising:
  a. first means synchronizing said circuit to normal central processor unit instruction operations, and
  b. means responsive to said first means and the end of an instruction operation for enabling said priority interruption instruction circuit.

17. A digital computer system as recited in claim 16 wherein
  i. said priority interruption signal transmitting means in each of said peripheral units includes enabling means responsive to predetermined data and control signals for inhibiting a transfer of priority interruption signals onto said first control wires, and
  ii. said priority determining means in said central processor unit additionally including an input channel for each priority level, each input channel including means for disabling itself.

* * * * *